Patented Nov. 17, 1942

2,302,445

UNITED STATES PATENT OFFICE 2,302,445

METHOD OF POLYMERIZING 2-CHLORO-BUTADIENE-1,3

Siegfried Kiesskalt, Frankfort-on-the-Main-Hochst, Wilhelm Schaich, Bad Soden in Taunus, and Hans Brunotte and Karl Winnacker, Frankfort-on-the-Main-Hochst, Germany; vested in the Alien Property Custodian No Drawing. Application July 12, 1938, Serial No. 218,758. In Germany May 11, 1937

6 Claims. (Cl. 260—32)

The present invention relates to polymerization products of 2-chlorobutadiene-1.3 and to a process of preparing them.

During the polymerization of 2-chlorobutadiene there are obtained polymerization products which, though they possess highly valuable properties, have the drawback that already after a short storing in the non-vulcanised condition they become extremely hard and stiff. It is known that this stiffening may be retarded by adding to the 2-chlorbutadiene before the polymerization other polymerizable compounds, for instance vinyl derivatives and preparing interpolymerization products from the resulting composition. If large quantities say 25 per cent. or more of the said vinyl compounds are used, polymerization products of a sticky, plastic, resinous character are obtained. If less than 25 per cent. are added, caoutchouc-like products of highly elastic properties are obtained to a larger extent. Furthermore it is known that these elastic, caoutchouc-like products are readily obtained if the polymerization is interrupted at a point where the polymerization has only proceeded to a low degree and the temperature is kept below 10° C.

Now we have found that 2-chlorobutadiene-1.3 may be polymerized particularly advantageously to caoutchouc-like products of highly elastic properties by operating at a temperature above about 30° C., for instance at about 40° C. and taking care, by the selection of a suitable vessel for the reaction, that the polymerization is interrupted after a relatively short time. As reaction vessels there may especially be used those devices of a small diameter and a great length in which for instance the proportion between diameter and length is between about 1:200 and about 1:2000, for instance 1:250. Preferably care is taken that the emulsion added is intimately mixed, for instance by rapid flowing or by application of known mixing devices. In order to reduce the length of the tube the process may be operated in a so-called ring gap, i. e. a space between two concentrically arranged tubes for instance a tube of a length of 5 meters and a width of 100 mm. in which a narrower tube of about 80 to 90 mm. width is concentrically arranged.

There is thus obtained, in a yield of about 40 per cent. and more and in a period of 20 to 25 minutes, a product which, besides possessing highly elastic properties, has the advantage of considerably lesser tendency to the aforedescribed hardening than 2-chlorobutadiene polymerized according to the hitherto known methods. Particularly valuable non-hardening products are obtained if the process described is applied to the known interpolymerizations of 2-chlorobutadiene with vinyl compounds, particularly vinylmethylketone. The second polymerizable component may be added in a quantity up to 20 per cent. Acrylic acid nitrile, vinyl acetate and vinylmethylketone may be used. It is, of course, also possible to accelerate the polymerization which under the conditions described occurs at a raised temperature in a relatively short time, by the addition of known accelerators, for instance benzoyl peroxide. The emulsion of the monomeric product may contain the known emulsifying agents, such as salts of fatty acids or of alkylated naphthalene sulfonic acids.

The polymerization may also be carried out at a temperature above 40° C. The yield may be increased thereby in the same period of time or the duration of the reaction may be decreased with the production of the same yield. One may operate for instance at 50° C. or at 55° C. It is advisable, owing to technical difficulties, not to approach too closely to the boiling point of the 2-chlorobutadiene.

The advantage of the process claimed resides in the following: products of good properties are obtained; the reaction which occurs slowly and, according to the hitherto known processes had to be carried out in large containers, can now be performed within a short time; owing to the arrangement of the apparatus the polymerization may easily be interrupted at any desired moment, for instance before a high degree of polymerization is attained.

2-chlorobutadiene which may not have been polymerized may be recovered by distilling under reduced pressure from the finished emulsion the monomeric 2-chlorobutadiene or the vinyl derivatives added thereto. The monomeric products may also be recovered by precipitating with acid the colloidally dispersed emulsion of the polymerization products and separating the monomeric products insoluble in the precipitating liquid.

We have furthermore found that industrially especially valuable products are obtained by subdividing the reaction chamber into two temperature zones. According to the new process one operates in the following manner: the 2-chlorobutadiene in an aqueous suspension if required with the addition of a suitable emulsifying agent and a suitable catalyst, is caused to pass through a container heated to a temperature, below the boiling point of the 2-chlorobutadiene, for instance from about 30° C. to about 60° C., and subsequently the polymerization is caused to take place in a container heated to a lower temperature than the first named container for instance about 15° C. to about 25° C. The containers for the reaction may be constructed in such a manner that the duration of the reaction in the first chamber at the higher temperature amounts only to about 1 to about 2 minutes, whereas the material passes the second container within about 1 to about 2 hours. Preferably the duration in the first container is from about 1 to about 1½ minutes and in the second container about 80 minutes. It has been observed that in the first container substantially no polymerization occurs. This can be ascertained by precipitating the polymerization product with acid and a salt solution. The polymerizate is formed in the desired quantity only during a further reaction at a lower temperature and for a longer duration.

This behaviour is probably due to the fact that, owing to the formation of nuclei, a reaction is started at a high temperature in the first-named vessel. This reaction is then slowly continued in the low temperature zone. There are thus obtained products of a very high plasticity which may readily be further treated in the usual devices, such as rollers or kneading apparatus. In contradistinction to the method of operating in a high temperature zone for a long period of time, the subdivision of the reaction chamber involves the advantage that the polymerization may be continued to a considerably further extent with formation of better products than this was hitherto possible. For instance on the addition of 5 per cent. of vinylmethyl-ketone without the use of the usual regulators the polymerization may be continued until a yield of 90 per cent. of the polymerization product is attained. The coagulate does not become hard as was observed when only one temperature zone is employed. In contrast to operating exclusively at low temperatures, for instance at 20° C., the previous use of a reaction zone operated at a high temperature and a short period of time has the advantage that the yields within a certain space and period are essentially higher.

The following examples in which the parts are by weight serve to illustrate the invention, but they are not intended to limit it thereto.

(1) 80 parts of 2-chlorobutadiene are suspended in 120 parts of water at 5° C. by the addition of 2.5 parts of sodium di-isobutyl-naphthalene sulfonate and 1.5 parts of sodium oleate. The emulsion is caused to pass through a tube of an inner diameter of 10 mm. and a length of 250 mm. which is kept at 35° C. by a liquid bath. The velocity of flow is so regulated that a duration of about 25 minutes is attained. During this period about 40 per cent. of the 2-chlorobutadiene introduced are polymerized. The monomeric non-polymerized 2-chlorobutadiene is recovered by distillation from the colloidally dispersed emulsion obtained. The polymerizate is precipitated and further treated in known manner. Polymerization products are obtained which on storing for a prolonged time in the non-vulcanized condition keep their plasticity.

(2) 72 parts of 2-chlorobutadiene and 8 parts of vinylmethyl-ketone are emulsified in 120 parts of water at 5° C. with the aid of 2.5 parts of sodium di-isobutylnapthalene-sulfonate and 1.5 parts of sodium oleate. The emulsion obtained is passed at 35° C. through a tube of an inner diameter of 10 mm. and a length of 2500 mm. The velocity of flow is so regulated that a duration of about 25 minutes is observed during which period about 35 per cent of the monomeric product introduced are caused to react. After the non-transformed monomeric product has been distilled a coagulate is obtained which, when further treated in the usual manner shows a strength up to 280 kilograms per square centimeter and an extension up to 700 per cent. The special advantage of the material thus obtained resides in the fact that when it is stored in the unmixed and non-vulcanized state it does not harden even after three months.

(3) 72 parts of 2-chlorobutadiene and 8 parts of acrylic nitrile are suspended in 120 parts of water with the aid of 4 parts of sodium oleate. The suspension obtained is passed through a tube kept at 35° C. by means of a liquid bath. The duration of the suspension in the tube amounts to about 30 minutes and about 40 to 50 per cent. of the material introduced are caused to react. The non-transformed starting material is recovered by distillation from the colloidally dispersed emulsion obtained. There is produced a highly elastic material of a high strength and a caoutchouc-like character.

(4) 72 parts of 2-chlorobutadiene and 8 parts of vinylmethyl-ketone are emulsified in 120 parts of water at 0° to 5° C. with the aid of 2.5 parts of sodium di-isobutylnaphthalene-sulfonate and 1.5 parts of sodium oleate. The emulsion obtained is pumped at 35° C. through a tube of an inner diameter of 10 mm. and a length of 2500 mm. The velocity of flow is so adjusted that a duration of 80 minutes is attained. During this time about 90 per cent. of the monomeric product introduced have been caused to react. On precipitation a coagulate is obtained which when further treated in the usual manner shows a strength up to 280 kilograms per square centimeter and an extension up to 600 per cent. The special advantage of the material thus obtained resides in the fact that on storing it in the unmixed and non-vulcanized condition as well as in the vulcanized form it is hardened substantially less than a product obtained according to known processes.

(5) 72 parts of 2-chlorobutadiene and 8 parts of vinylmethyl ketone are emulsified in 120 parts of water at 5° C. while adding 2.5 parts of sodium di-isobutylnaphthalene sulfonate and 1.5 parts of sodium oleate. The emulsion obtained is introduced at 50° C. into a tube of an inner diameter of 10 mm. and a length of 5000 mm. The velocity of flow is so regulated that a duration of about 30 minutes is attained. During this period about 45 per cent. of the monomeric product are caused to react. The non-transformed monomeric product is distilled at about 30° C. under reduced pressure from the emulsion produced. The coagulate obtained in the usual manner has a strength of about 270 kilograms per square centimetre and an extension of about 600 per cent. The advantage of the material thus obtained resides in the fact that when stored for a prolonged time and when coming into contact with the atmosphere it does not harden either in the unmixed or in the non-vulcanized state.

(6) 80 parts of 2-chlorobutadiene are suspended in 120 parts of water at 0° to 5° C. by the addition of 2.5 parts of sodium di-isobutylnaphthalene sulfonate and 1 part of sodium oleate. The emulsion is passed through a tube of an inner diameter of 10 mm. and a length of 2500 mm. The tube is kept at 45° C. by means of a liquid bath. If the velocity of flow is so regulated that a duration of about 90 minutes is observed about 95 per cent. of the 2-chloro-butadiene introduced are polymerized. The polymerization product is precipitated and further treated in known manner. The polymerization products obtained have a strength up to 275 kilograms per square centimetre and an extension up to 600 per cent. They keep their softness after having been stored for a prolonged time.

(7) 76 parts of 2-chlorobutadiene and 4 parts of vinylmethyl ketone are emulsified in 160 parts of water at 5° C. while adding 2.5 parts of sodium di-isobutylnaphthalene-sulfonate and 1.5 parts of sodium oleate. The emulsion obtained is passed at 55° C. through a tube of an inner diameter of 5 mm. and a length of about 1 meter. The velocity of flow is so regulated that a duration of about 1 minute to 1½ minutes is attained. The emulsion is then passed through a tube wherein the temperature is kept at 20° C. The tube is so dimensioned that a duration of the reaction therein is about 80 minutes. The tube has for instance a diameter of 10 millimeters and a length of 20 meters. The emulsion is then again cooled to 5° C. The product further treated in the usual manner has a strength of about 280 kilograms per square centimeter and an extension of 600 per cent. 90 per cent. of the product introduced have been caused to react. The advantage of this method of operating and of the subdivision of the reaction chamber resides in the fact that it is thus possible to attain nearly a complete polymerization. In consequence thereof the recovery of the monomeric product can be dispensed with.

The 2-chlorobutadiene may be polymerized as such in the same manner without the addition of vinyl methyl-ketone.

(8) 76 parts of 2-chlorobutadiene and 4 parts of vinyl acetate are emulsified in 160 parts of water at 5° C. while adding 2.5 parts of sodium di-isobutylnaphthalene sulfonate and 1.5 parts of sodium oleate. The emulsion obtained is subjected to a polymerization as described in Example 7. The final product then obtained has the same properties as the product of the preceding example.

We claim:

1. In the process of polymerizing 2-chlorobutadiene-1.3 the step which comprises causing an aqueous emulsion of the monomeric compound to flow within about 1 to about 2 minutes through a narrow, elongated tube at a temperature between about 30° C. and about 60° C. and then within about one to about 2 hours through a similar vessel at a temperature between about 15° C. and about 25° C.

2. In the process of polymerizing 2-chlorobutadiene-1.3 the step which comprises causing an aqueous emulsion of the monomeric compound to flow within about 1-1½ minutes through a narrow, elongated tube at a temperature of 55° C. and then within about 80 minutes through a similar vessel at a temperature of 20° C.

3. In the process of polymerizing mixtures of 2-chlorobutadiene-1.3 with vinylmethyl-ketone the step which comprises causing an aqueous emulsion of the monomeric compounds to flow within about 1-1½ minutes through a narrow, elongated tube at a temperature of 55° C. and then within about 80 minutes through a similar vessel at a temperature of 20° C.

4. In the process of polymerizing 2-chlorobutadiene-1.3 the steps which comprise causing an aqueous emulsion of the monomer to flow within about 1 to about 2 minutes through a vessel, the ratio of whose diameter to length is from about 1 to about 200 to 2000, at a temperature between about 30° C. and about 60° C., and then within about 1 to 2 hours through a vessel of the same proportions, at a temperature of between about 15° C. and 25° C.

5. The process as defined in claim 4, wherein the time of flow through the first vessel is about 1 to 1½ minutes, at a temperature of 55° C. and wherein the time of flow through the second vessel is about 80 minutes, at a temperature of 20° C.

6. In the process of polymerizing mixtures of 2-chlorobutadiene-1.3 with vinyl methyl-ketone, the steps which comprise causing an aqueous emulsion of these monomers to flow within about 1 to about 1½ minutes through a vessel, the ratio of whose diameter to length is about 1 to 200 to 2000, at a temperature of 55° C., and then within about 80 minutes through a vessel of the same proportions, at a temperature of 20° C.

SIEGFRIED KIESSKALT.
WILHELM SCHAICH.
HANS BRUNOTTE.
KARL WINNACKER.